United States Patent
Kortesalmi et al.

(10) Patent No.: US 9,663,015 B2
(45) Date of Patent: May 30, 2017

(54) TRANSPORT APPARATUS FOR TRANSPORTING HEAVY OBJECTS

(71) Applicant: SLEIPNER FINLAND OY, Jyvaskyla (FI)

(72) Inventors: Ossi Kortesalmi, Palokka (FI); Teijo Hoyla, Vihtavuori (FI)

(73) Assignee: SLEIPNER FINLAND OY, Jyvaskyla (FI)

( * ) Notice: Subject to any disclaimer, the term of this patent is extended or adjusted under 35 U.S.C. 154(b) by 131 days.

(21) Appl. No.: 14/380,390

(22) PCT Filed: Feb. 22, 2013

(86) PCT No.: PCT/FI2013/050203
§ 371 (c)(1),
(2) Date: Aug. 22, 2014

(87) PCT Pub. No.: WO2013/124543
PCT Pub. Date: Aug. 29, 2013

(65) Prior Publication Data
US 2015/0014960 A1    Jan. 15, 2015

(30) Foreign Application Priority Data

Feb. 24, 2012  (FI) .................................... 20125214

(51) Int. Cl.
| | |
|---|---|
| *B60P 3/06* | (2006.01) |
| *B62D 53/04* | (2006.01) |
| *B62D 63/06* | (2006.01) |
| *E02F 9/00* | (2006.01) |
| *B60P 3/40* | (2006.01) |
| *B62D 21/20* | (2006.01) |

(52) U.S. Cl.
CPC ............... *B60P 3/062* (2013.01); *B60P 3/06* (2013.01); *B60P 3/40* (2013.01); *B62D 21/20* (2013.01);
(Continued)

(58) Field of Classification Search
CPC ....... B60P 3/062; B62D 53/005; B62D 53/04; B62D 63/062; E02F 9/003
(Continued)

(56) References Cited

U.S. PATENT DOCUMENTS 3,330,574 A * 7/1967 Kulyk ................... B62D 21/14
280/425.1
4,262,923 A * 4/1981 Weir .................... B62D 53/068
280/656
(Continued)

FOREIGN PATENT DOCUMENTS

| CA | 1291072 | 10/1991 |
|---|---|---|
| DE | 2134583 | 1/1973 |

(Continued)

OTHER PUBLICATIONS

English abstract for WO9847747 (A1) corresponding to FI101779.

*Primary Examiner* — Jacob Knutson
(74) *Attorney, Agent, or Firm* — Fildes & Outland, P.C.

(57) ABSTRACT

A transport apparatus for transporting heavy objects includes a chassis, which includes at least two side parts and a platform part and rear part between them, a load space arranged in the middle of the chassis, and at least one wheel mounted on each side of the load space of the chassis, with the aid of an axle. The chassis also includes a front part and second side parts, of which the second side parts, the front part, and the rear part together form a frame enclosed on the horizontal plane, inside of which frame is located at least one wheel on each side of the load space, its axle being supported on at least the second side part.

9 Claims, 12 Drawing Sheets

(52) U.S. Cl.
CPC ........... *B62D 53/04* (2013.01); *B62D 63/062* (2013.01); *E02F 9/003* (2013.01)

(58) Field of Classification Search
USPC ... 280/404, 656, 638, 415.1, 43, 418, 106 T, 280/415; 414/538, 559, 539, 482, 494, 414/500; 296/181, 182, 26.01; 214/505, 214/515
See application file for complete search history.

(56) References Cited

U.S. PATENT DOCUMENTS

| | | | | |
|---|---|---|---|---|
| 4,621,972 A | * | 11/1986 | Grotte | 414/477 |
| 4,986,559 A | * | 1/1991 | Yaklin | B62D 13/02 |
| | | | | 280/402 |
| 5,016,896 A | * | 5/1991 | Shafer | B60P 3/07 |
| | | | | 280/400 |
| 6,050,578 A | * | 4/2000 | Beck | 280/86.5 |
| 6,623,028 B1 | * | 9/2003 | Johnston | B62D 63/061 |
| | | | | 280/656 |
| 7,326,022 B2 | * | 2/2008 | Brown | B62D 63/061 |
| | | | | 280/656 |
| 7,891,697 B1 | * | 2/2011 | Fahrbach | B62D 63/061 |
| | | | | 280/656 |
| 2002/0066604 A1 | | 6/2002 | Kortesalmi | |
| 2006/0210381 A1 | * | 9/2006 | Pollnow | B60P 1/025 |
| | | | | 414/482 |

FOREIGN PATENT DOCUMENTS

| | | |
|---|---|---|
| FI | 101779 | 8/1998 |
| FR | 372741 | 4/1907 |

* cited by examiner

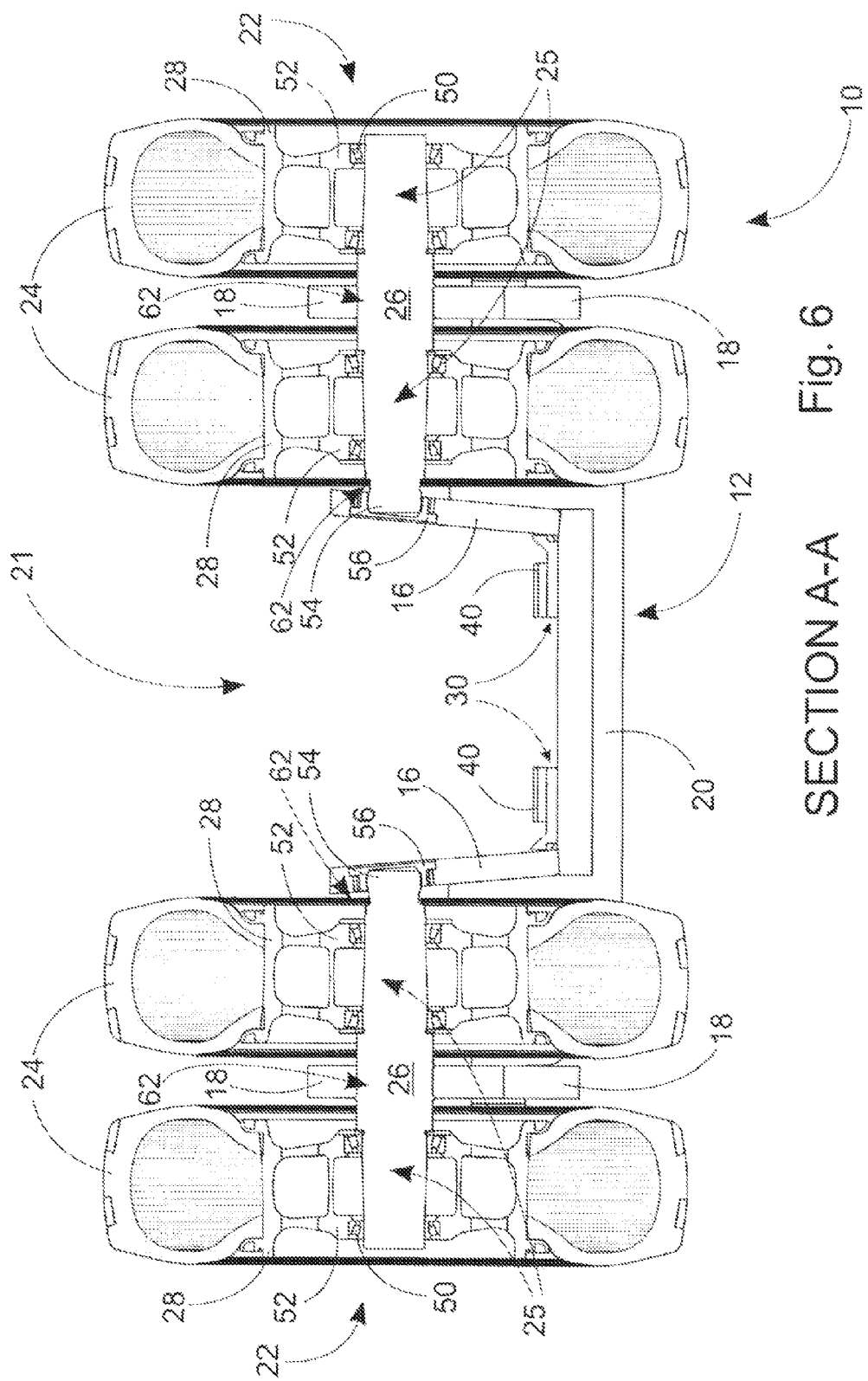
SECTION A-A  Fig. 6

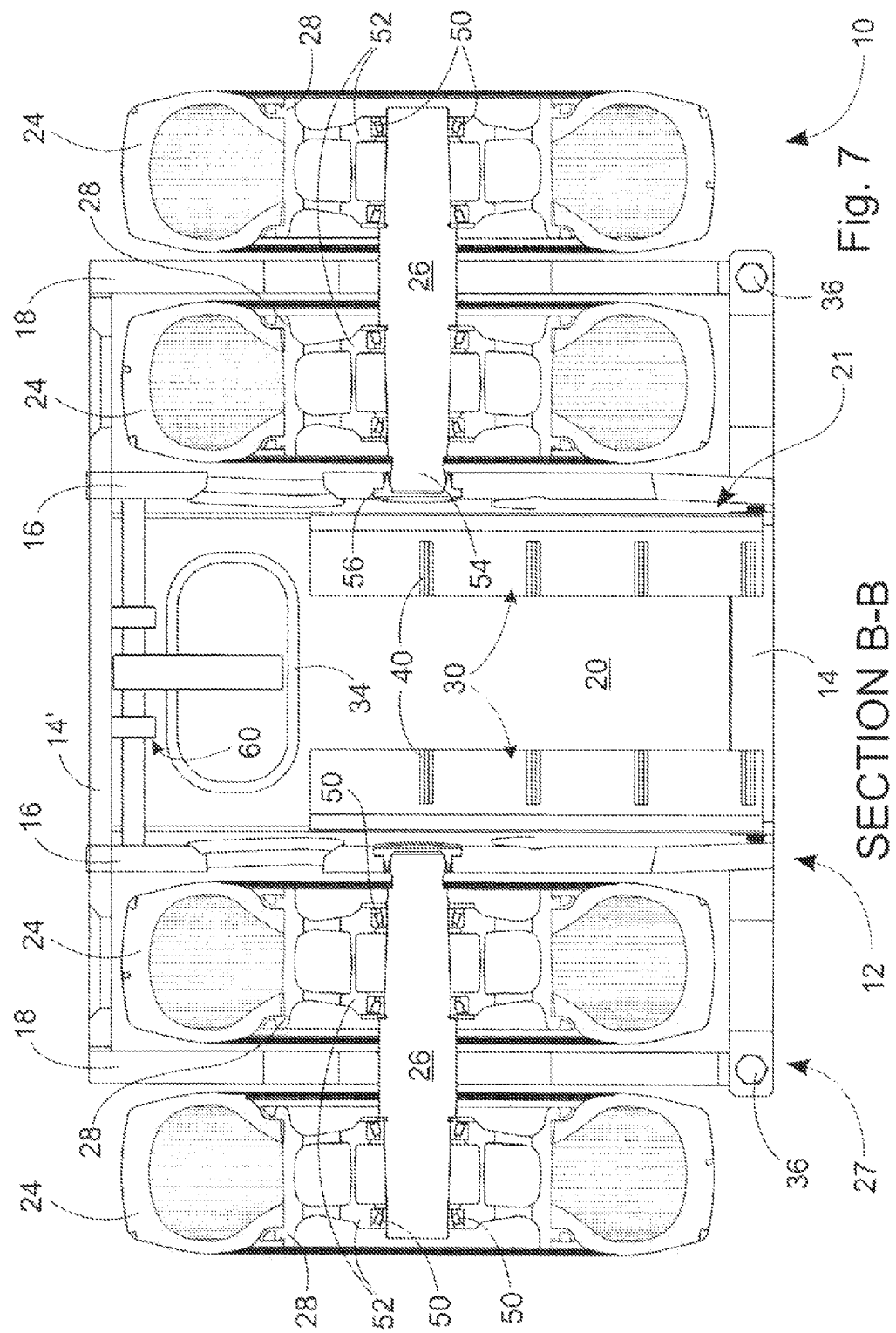
Fig. 7  SECTION B-B

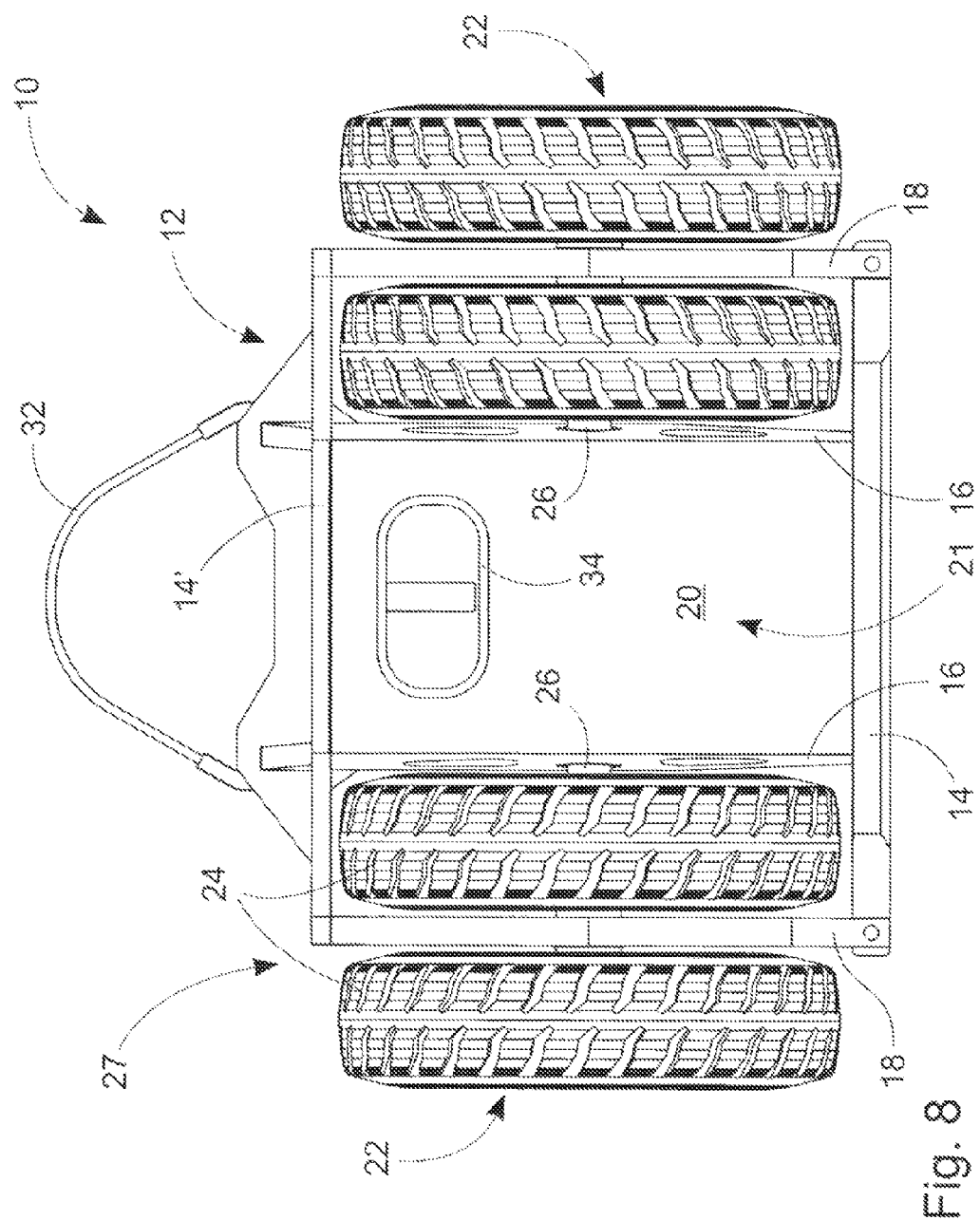

TRANSPORT APPARATUS FOR TRANSPORTING HEAVY OBJECTS

TECHNICAL FIELD

The present invention relates to a transport apparatus for transporting heavy objects, particularly a work machine, especially an excavator, moving on crawler tracks and equipped with an excavator device or other lifting element, which transport apparatus includes
- a chassis, which includes at least two side parts and a platform part and rear part between them,
- a load space arranged in the middle of the chassis on top of the platform part for the support surface of the object to be transported, and
- at least one wheel on each side of the load space of the chassis mounted on the chassis with the aid of an axle.

BACKGROUND OF THE INVENTION

Traditionally, excavators and similar loaders are movable with the aid of a crawler-track undercarriage. Long-distance transportation is a problem with loaders equipped with a crawler-track undercarriage. Driving long distances on a crawler-track undercarriage wears the undercarriage and is extremely slow. Transportation therefore usually takes place on a carriage. However, this requires a special carriage, on which the transportation takes place.

Known from the prior art is patent publication FI 101779 B, which discloses separate transport apparatuses, on top of which the crawler-track undercarriage of a loader is driven for the duration of the transportation. There is one transport apparatus for each track of the crawler-track undercarriage. The loader is supported by its boom on a work machine, for example a dump truck, which tows the loader after it. The transport apparatus includes a chassis forming a track space and wheels mounted on both sides of the chassis. However, such a solution has a drawback of a limited load-carrying capacity, which limits the weight of the loaders being transported to about 400 tn. With loaders larger than this, the support of the axles of the transport wheels must be reinforced to such an extent as to increase the overall width of the transport wheels. The distance between the transport wheels of both tracks is reduced so much that the transport wheels may strike each other when the axles tilt in an unsynchronized manner due to ground unevennesses. Alternatively, it may also happen that the wheels of the transport apparatus cannot fit between the tracks of the loader. In other words, space in the lateral direction under the loader runs out. In addition, with loaders weighing more than 190 tn the crawler tracks become so wide that they cannot fit into solutions according to the prior art. The problem can also appear even in loaders weighing 190 tn, if the loader's tracks are wider than normal, for example when operating on soft surfaces.

SUMMARY OF THE INVENTION

The invention is intended to create a transport apparatus, which is more suitable than solutions according to the prior art for the transportation of heavy objects, especially for transportation of loaders weighing more than 190 tn.

This intention can be achieved by means of a transportation apparatus according to the invention, which includes a chassis, which includes at least two side parts and a platform part and rear part between them, a load space arranged in the middle of the chassis on top of the platform part for the support surface of the object to be transported, and at least one wheel mounted on each side of the load space of the chassis with the aid of an axle. In addition, the chassis includes a front part and second side parts, of which the second side parts, the front part, and the rear part together form a closed frame on the horizontal plane. On the inside of the frame is located at least one wheel on each side of the load space, its axle being supported on at least one of the side parts. The transport apparatus according to the invention is intended for the transportation of heavy objects, particularly a work machine, especially an excavator, moving on crawler tracks and equipped with an excavator device or other lifting element.

Using the solution according to the invention, a very sturdy chassis structure is formed, which permits large loads to be carried and extensibility in terms of the number of wheels. Further, the frame permits the axle to be attached in the middle of a second side part, thus transmitting most of the load to the second side part. By means of the solution according to the invention, the overall width of the transport apparatus is kept sufficiently narrow, even when transporting objects weighing more than 190 tn.

Each axle is preferably supported on the chassis with the aid of a spherical surface. The spherical surface permits the controlled distribution of the loading forces over the chassis of the transport apparatus. With the aid of the spherical surface, an elastic structure is obtained from the support of the axles.

At least between the rear part and the side parts there can be interlocking-joint means to transmit the forces caused by the object to the side parts. With the aid of the interlocking-joint means, the mutual attachment of the parts of the chassis can be implemented as a light, appropriate structure.

According to one embodiment, the transport apparatus includes at least two wheels mounted on axles on each side of the load space, in such a way that only one wheel is mounted on an axle on each supported axle span. Thus, a considerably smaller load than in apparatuses according to the prior art is directed to each axle span, allowing the axle and its suspension to be designed to be very compact. This makes the overall width of the transport apparatus narrower, though the load-bearing capacity of the transport apparatus is increased.

According to one embodiment, the wheels include rims and hubs that are integrated with each other. The hubs and rims can therefore be manufactured as a unified unit, facilitating their manufacture. In addition, such a solution permits the wheel to be attached without the labourious attachment of a rim incorporating many tens of bolts to the hub of the wheel.

The side parts, the second side parts, the front part, the rear part, and the platform part can be attached to each other by bolted joints. Bolted joints are easier to manufacture and can be opened if required. The use of bolted joints considerably reduces the number of points to be welded, compared to solutions according to the prior art. Bolted joints can be arranged at the locations of the interlocking-joint means. Maximum compression will then be achieved close to the load-bearing part.

According to one embodiment, in the transport apparatus each axle is supported on the chassis from at least two support points in the chassis. The distance between the axle's support points will remain less than in a solution with external axles.

Each axle can be supported by a spherical surface on one side part and attached permanently and in a manner run through to the second side part. This will considerably reduce the torsional moment acting on the axle and consequently permit the use of a lighter axle attachment.

According to another embodiment, the second side parts are supported on a spherical surface from the front part and the rear part. This makes the axle a so-called floating axle, i.e. it can tilt in the lateral direction of the transport apparatus. This in turn permits an equal surface pressure between the wheels on the same axle, when operating on an uneven base. Here, the term spherical surface also refers to a pivot point rotating in one direction.

Each wheel is preferably mounted independently in bearings on the axle. Thus, there can be a speed difference between the wheels, which will make the apparatus easier to steer in bends and reduce the strains on the axle and tyres.

The mass of the object transported by means of the transport apparatus according to the invention is more than 100 tn, preferably more than 400 tn. The greatest advantage is then obtained from the frame structure, as otherwise the dimensions of the structure of the chassis would grow to become extremely large.

The side parts and second side parts are preferably parallel to each other. The front part and the rear part are also parallel to each other.

According to one embodiment, the load space is a crawler-track space for the crawler track acting as the support surface of the work machine to be transported. The transport apparatus according to the invention is particularly advantageous in transporting work machines of this kind.

The transport device is preferably manufactured from steel with an ultimate strength of more than 500 MPa, preferably 600-1200 MPa. By using a steel grade of this kind the structure of the transport apparatus can be made light.

The axle is preferably supported at least on the second side part. Thus the forces will be transferred to the frame through the second side part.

In other words, in the transport apparatus according to the invention the second side parts of the chassis, the front part and the rear part together form a closed frame-like structure, in which, when the transport apparatus is seen at right angles to the platform part, the second side parts, the front part and the rear part delimit a closed area on both side of the load space for the wheels of the transport apparatus.

BRIEF DESCRIPTION OF THE DRAWINGS

In the following, the invention is described in detail reference to the accompanying drawings depicting some embodiments of the invention, in which FIG. 6 shows a cross-section of the transport apparatus according to the invention, running vertically through the apparatus and longitudinally through the axle, FIG. 7 shows a cross-section of the transport apparatus according to the invention, running horizontally through the apparatus and longitudinally through the axle, FIG. 8 shows a bottom view of the transport apparatus according to the invention.

DETAILED DESCRIPTION OF THE INVENTION

Figure 9A:
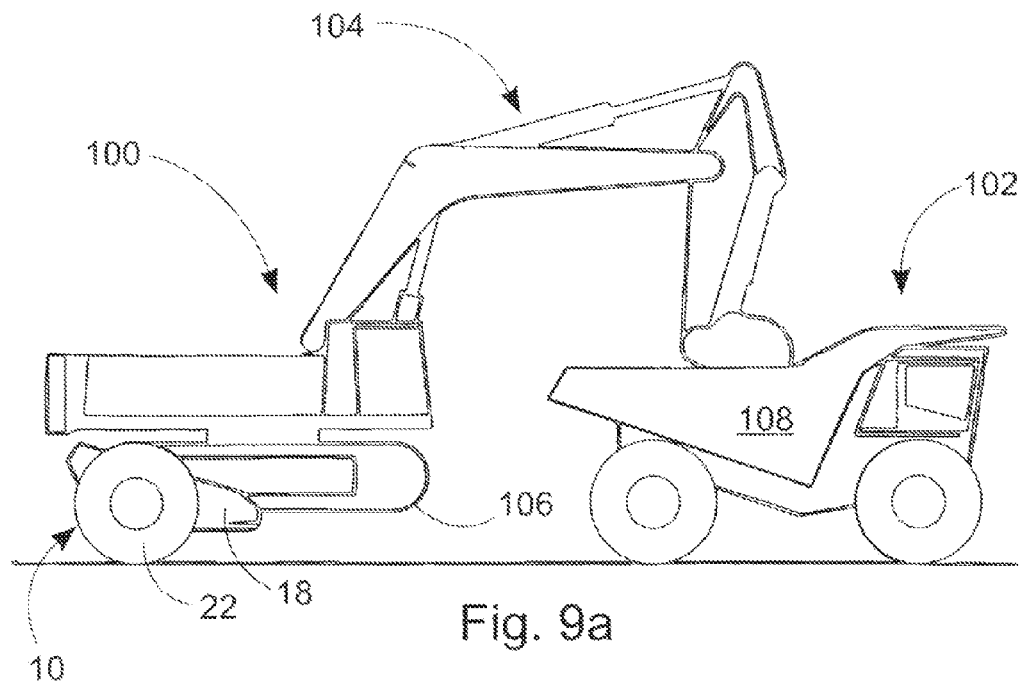
FIG. 9a shows a schematic side view of the transport apparatus according to the invention, when transporting a loader.
Figure 9B:
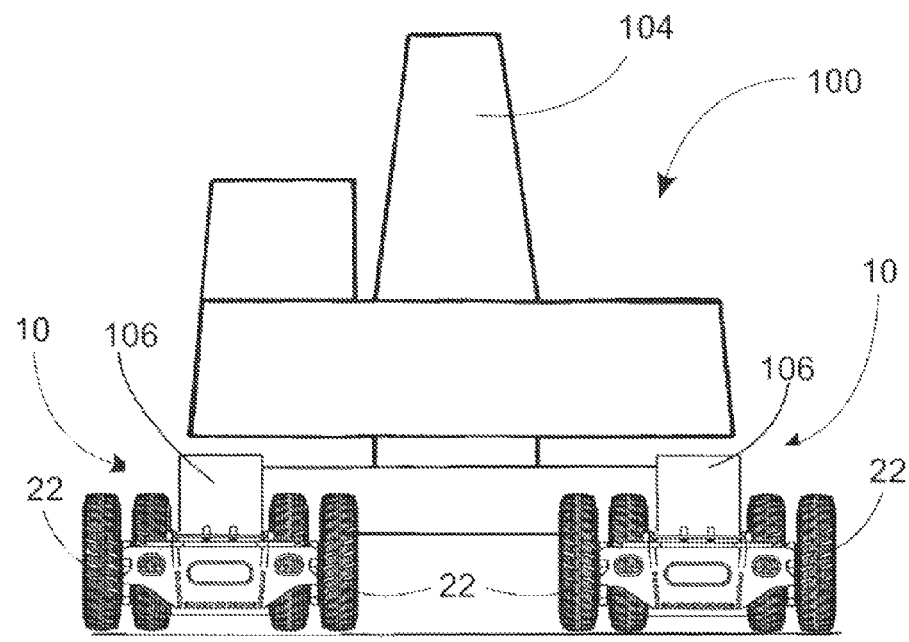
FIG. 9b shows a schematic rear view of the transport apparatus according to the invention, when transporting a loader.

FIGS. 1-8 show a preferred embodiment of the transport apparatus according to the invention. FIGS. 9a and 9b show schematic illustrations of the use of the transport apparatus when transporting a loader. The transport apparatus 10 of FIGS. 1-8 includes a chassis 12, wheels 22, and a load space 21 for transporting an object 100 (in FIGS. 9a and 9b). The chassis 12 of the transport apparatus 10 is formed of a plate-like rear part 14', a front part 14 (in FIG. 2), side parts 16, a platform part 20 between the side parts 16, and second side parts 18. Hereinafter the term inner side parts 16 will be used for the side parts 16 and the term outer side parts 18 for the second side parts 18.

The parts of the chassis 12 form, in the horizontal plane, a closed frame 27, inside which are preferably the inner wheels 23 and the load space 21. In the closed frame 27, a space which fits one or more wheels 24 is formed between the inner side part 16, the outer side part 18, the front part 14, and the rear part 14'. The load space is formed between the inner side parts 16, the front part 14, and the rear part 14', as well as on top of the platform part 20. The wheels 22 are, according to one embodiment, mounted on axles on the outer side parts 18 and axles 26 running through them, and from the ends of the axles 26 to the inner side parts 16. Deviating from the figures, the transport apparatus according to the invention can also be implemented in such a way that there is only one wheel on each side of the load space. In that case, the wheel must be of a great width, in order to achieve a sufficient load-carrying capacity.

Hereinafter, the term crawler space 21' will be used for the load space 21, because in the exemplary embodiments of the invention according to the figures the object to be transported is a loader equipped with crawler-tracks. Similarly, the term loader 100' will be used hereinafter for the object 100 to be transported.

Figure 1:
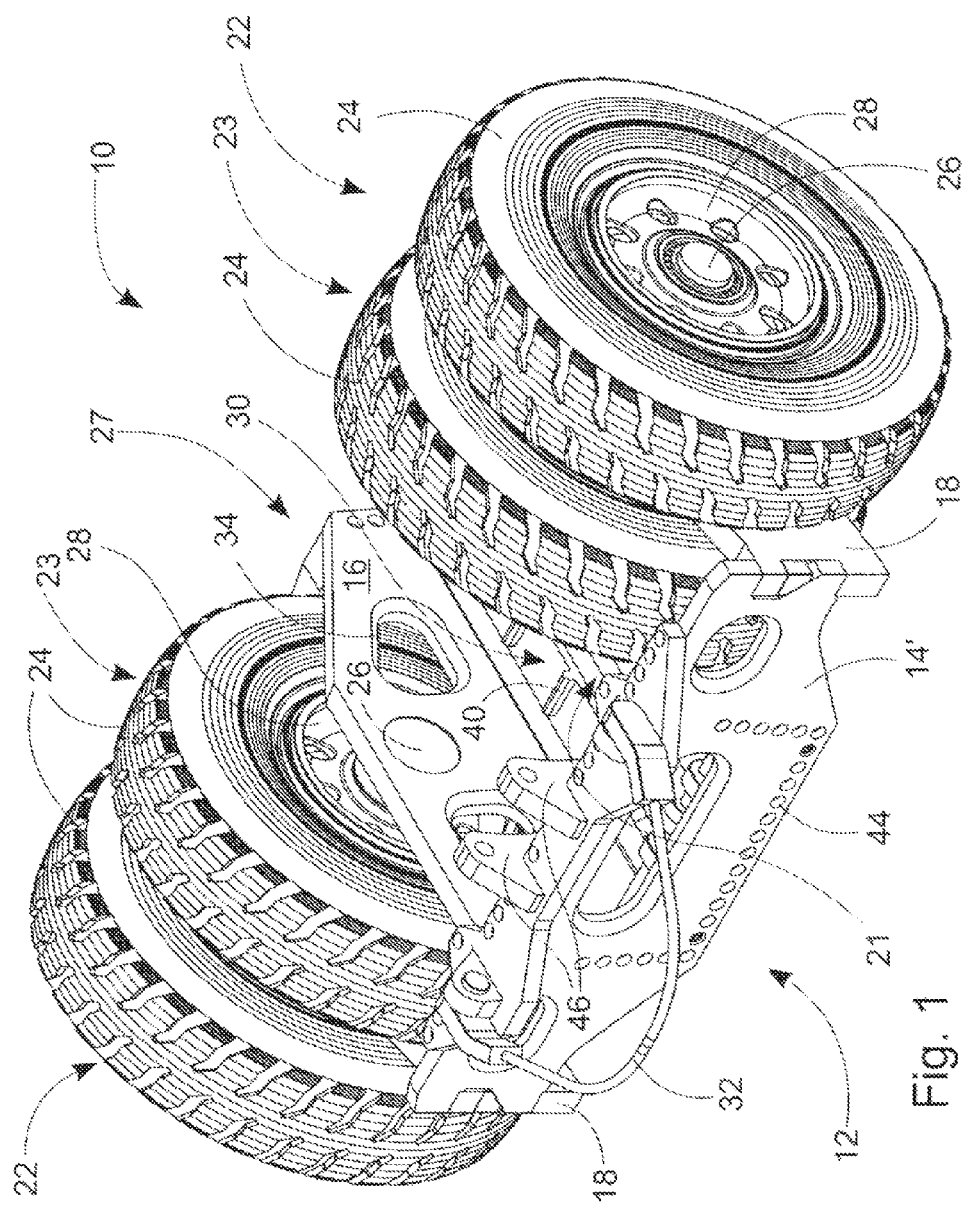
FIG. 1 shows an axonometric rear view of the transport apparatus according to the invention.
Figure 2:
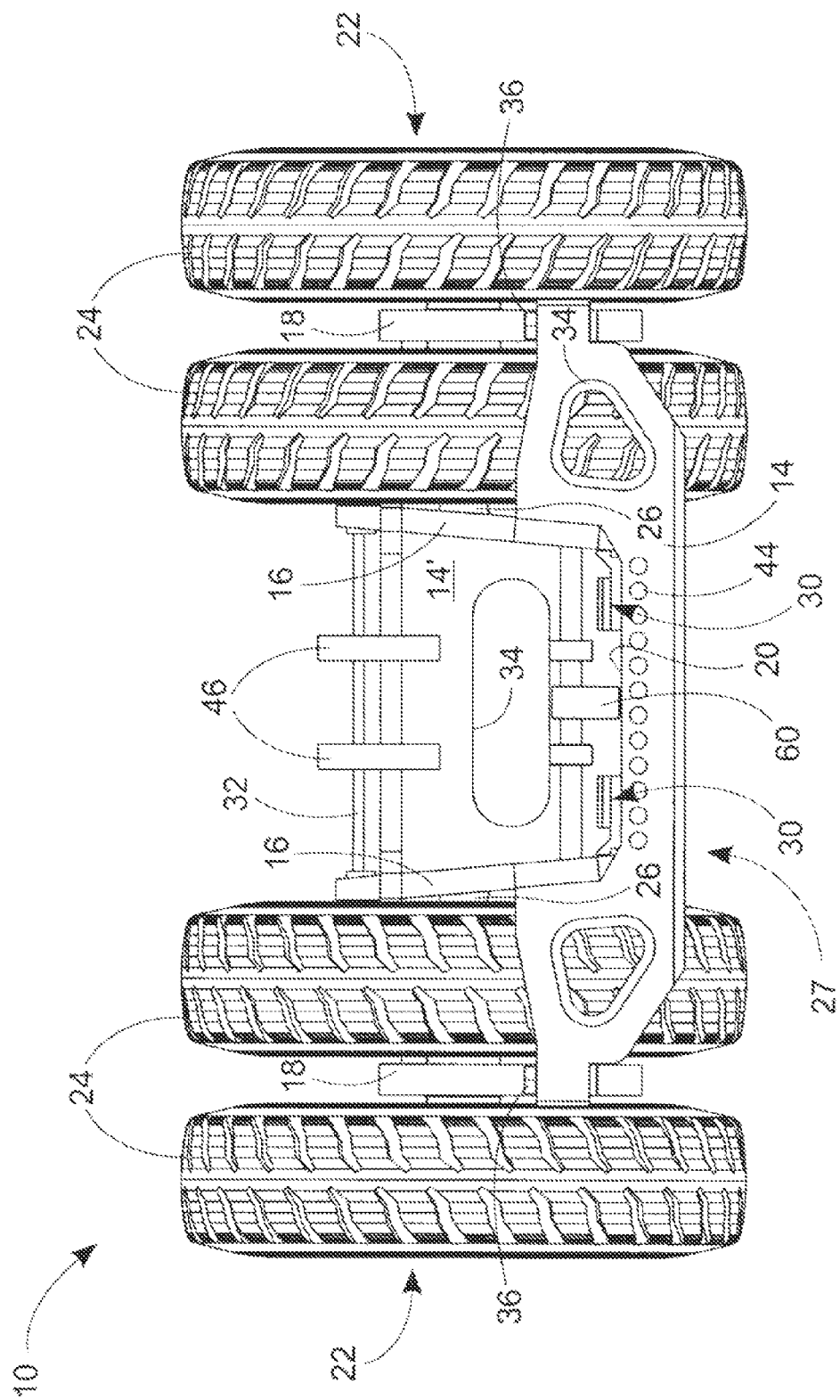
FIG. 2 shows a front view of the transport apparatus according to the invention.
Figure 3:
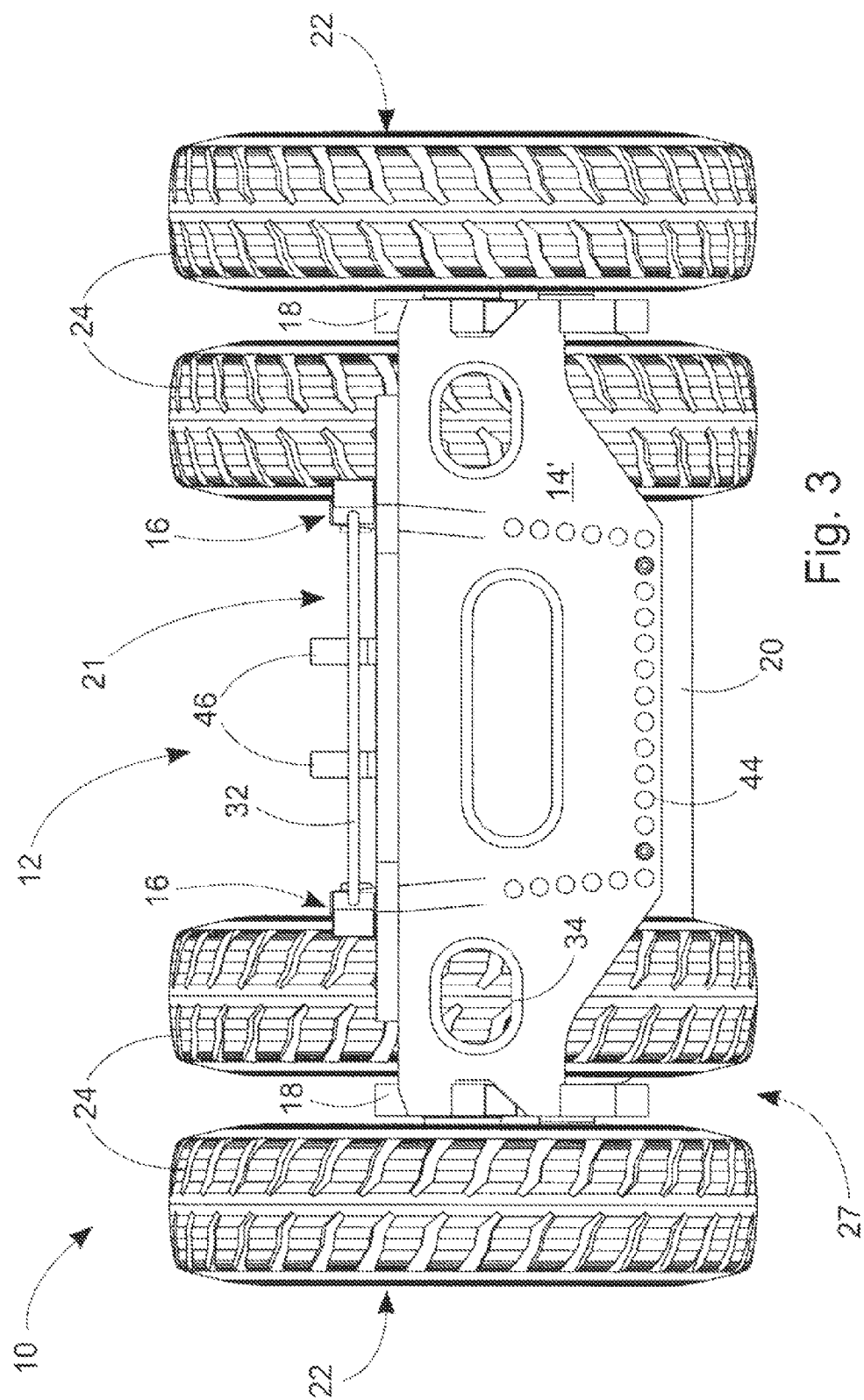
FIG. 3 shows a rear view of the transport apparatus according to the invention.

According to FIGS. 2 and 3, each wheel 22 is preferably mounted in bearings singly on the supported axle span 25 (in FIG. 6) of the axle 26. In this connection, the term axle span refers to the part of the axle outside the support point or points. Thus, the structure of the axle 26 and its support can be reasonably light, because the forces are transmitted to the axle's 26 support point or points 62 in the chassis 12. The support points 62 are shown in greater detail in FIGS. 6 and 7. Because the wheels 22 are mounted in bearings on the axle 26 close to the axle's 26 support point in the side parts 16 and 18, the torsional moment transmitted to the axle 26 through the wheels 22 remains reasonably small. Each axle 26 is preferably supported on the chassis 12 from at least two support points 62.

In the embodiment of the figures, the unified axle 26 runs through the outer side part 18, as far as to the inner side part 16. The axle 26 is supported on the inner side part 16 with the aid of a spherical surface 54, which is shown in FIGS. 6 and 7. During transportation, the weight of the loader is transmitted through the loader's crawler tracks to the crawler space 21' and from there through the rear part 14' and the front part 14 mainly to the outer side part 18. From the outer side part 18 the weight is transmitted to the axle 26 and then to the wheels 22. In other words, the outer side part 18 transmits the largest part of the forces to the axle 26 while the task of the inner side part 16 is to transmit the moment by means of the spherical surface 54 holding the axle 26 straight. The spherical surface 54 transmits the force to the inner side part 16 with the aid of a collar 56, despite possible torsion that may arise while moving. The use of a spherical surface permits the axle to flex at the correct point. In addition, the spherical surface facilitates the dimensioning of the transport apparatus. The axle 26 is fixed in the outer side part 18 at the support point 62. The axle's attachment solution is preferably similar on both sides of the transport apparatus.

Figure 4:
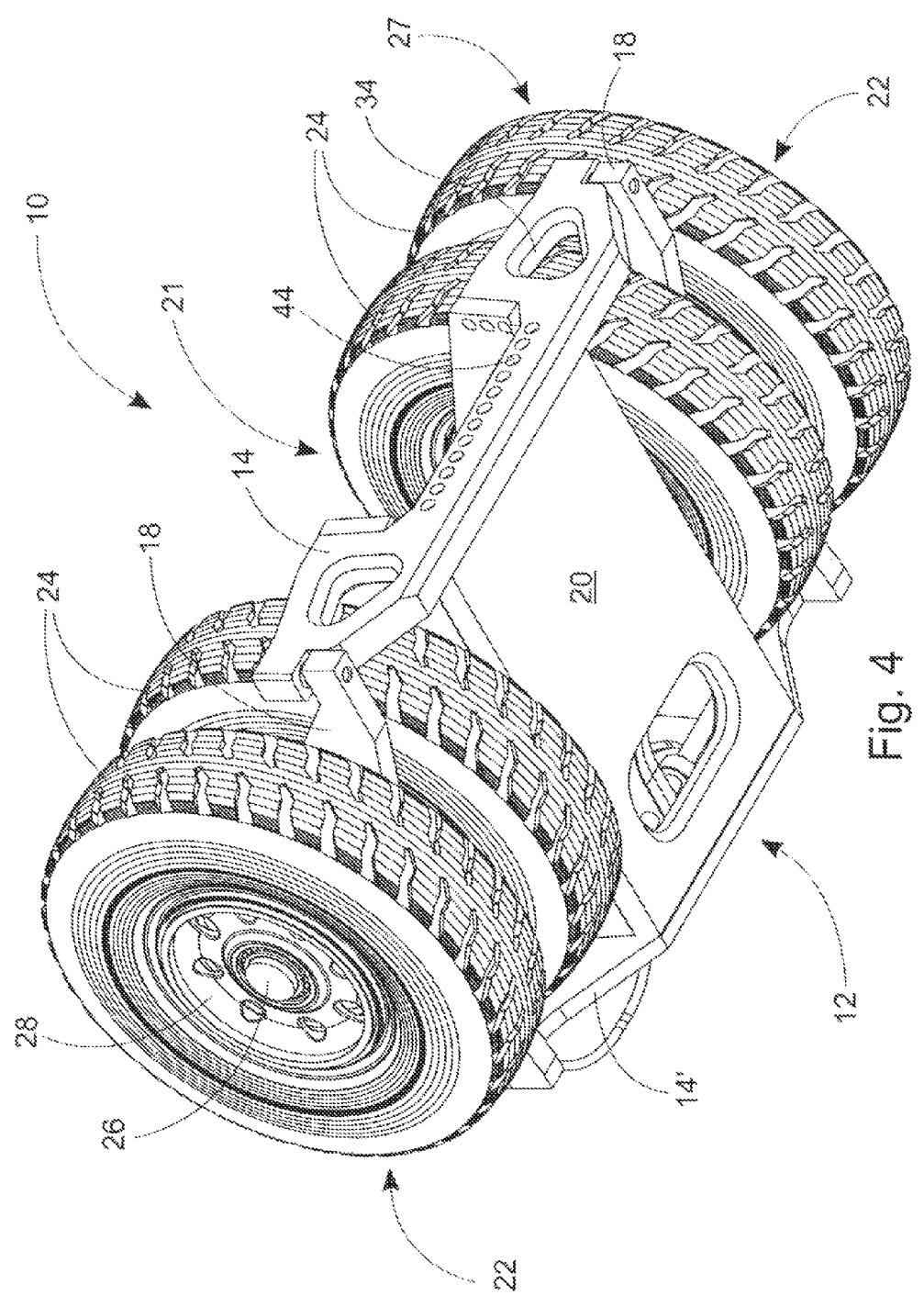
FIG. 4 shows an axonometric front view of the transport apparatus according to the invention.

According to FIG. 4, the plate-like parts of the chassis 12 can be lightened, for example with the aid of lightening holes 34. This will bring the advantage of reducing the total weight of the transport apparatus. The parts of the chassis 12 are preferably attached to each other with the aid of bolted joints 44, so that the transport apparatus 10 will be easier to manufacture. In addition, the bolted joints will be easy to open if required. The outer side parts 18 can be attached to the rear part 14' and the front part 14 with the aid of vertical bolted joints 36 (shown in FIG. 2). Thus the outer side parts can be easily detached, for example when changing a tyre. The bolts 36 can then be opened, the outer side part 18 detached, and the twin wheels lifted off the axle.

Figure 10A:
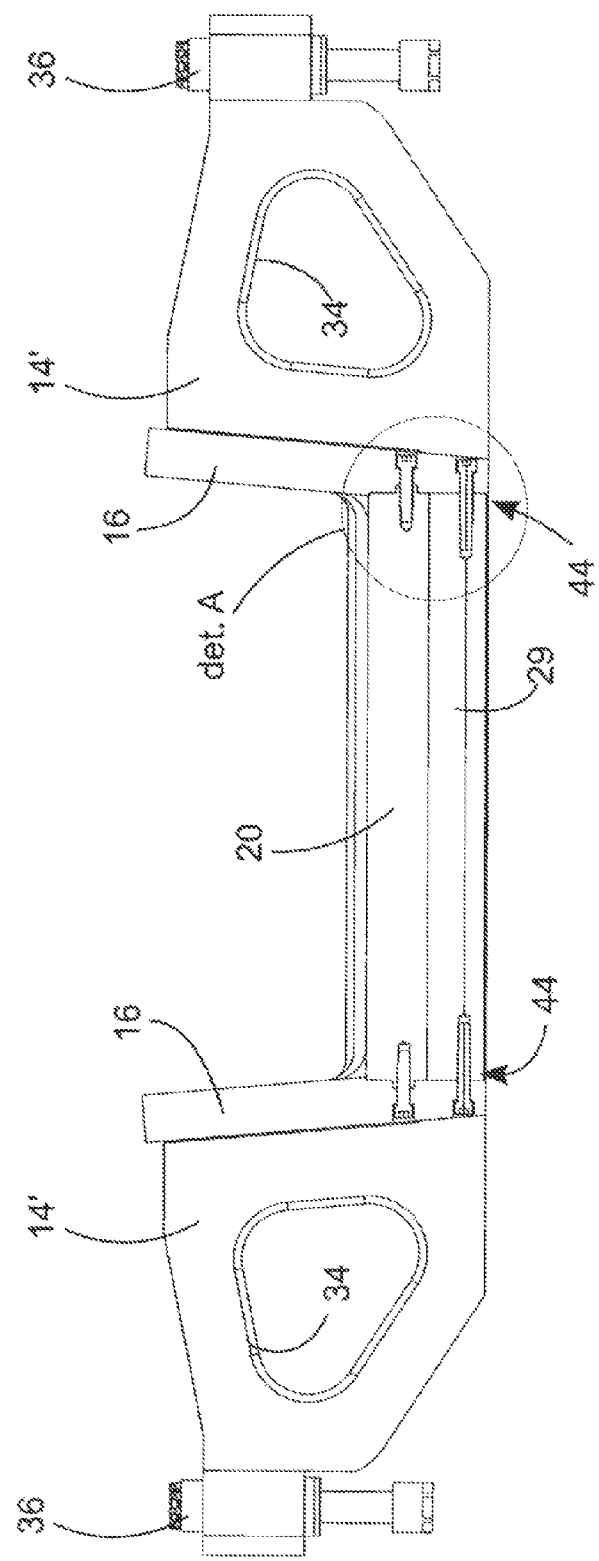
FIG. 10a shows the chassis of the transport apparatus according to the invention in a partial cross-section, without the second side parts and the wheels seen from behind.
Figure 10B:
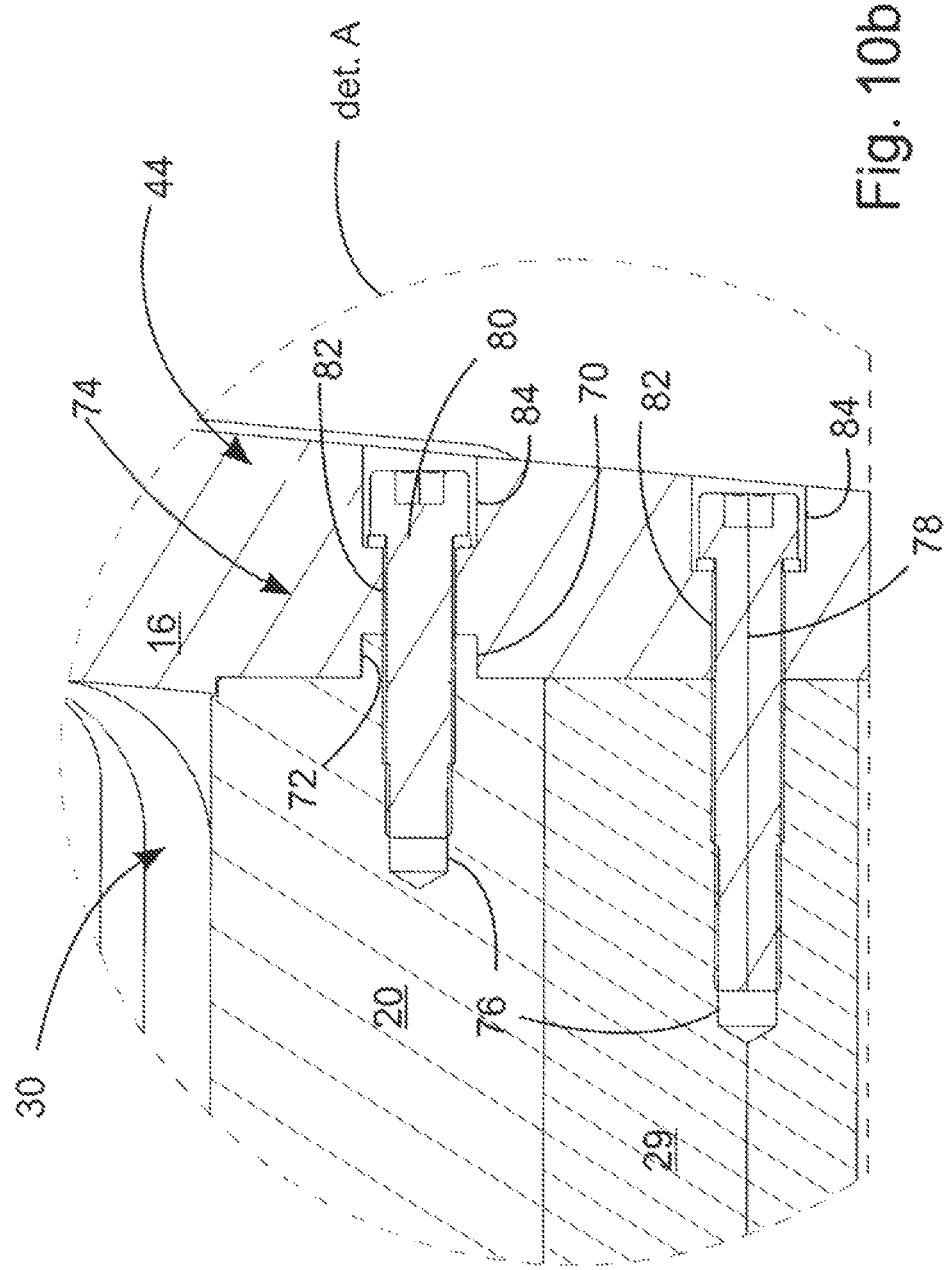
FIG. 10b shows a detail view of the bolted joint of FIG. 10a, and FIG. 11 shows the construction of a wheel of the transport apparatus according to the invention in greater detail.

An important point when using bolted joints is that there are preferably interlocking-joint means 74 between at least between the platform part 20 and the side parts 16. There are preferably also interlocking-joint means between the platform part 20 and the front part 14. FIG. 10b shows a schematic image of the interlocking-joint means 74. The male tongue 72 of the interlocking-joint means can be formed in the platform part 20, while the female grooves 70 can be formed in the side parts 16 and the front part 14. The male tongue and female groove can also be the other way round. The interlock makes it possible to considerably increase the horizontal load-bearing surface area between the parts, which carries a great portion of the load. This permits the joints between the parts to be implemented as bolted joints, as then the bolts only reinforce the joint and hold the parts together horizontally, whereas vertical retention takes place mainly with the aid of the interlocking-joint means. Without the interlocking-joint means, the number of bolts required would be so large that the platform part would have to be made thicker, so as to create a sufficiently large surface area for the bolts. In this connection, it should be understood that the term interlocking-joint means refers more generally to various kinds of tongue-and-groove joints, rebated joints, rabbet joints, and wedged joints, as well as different variations of these. For example, grooves can be machined in both pieces to be attached, between which a wedge forming the male piece is inserted.

Figure 5:
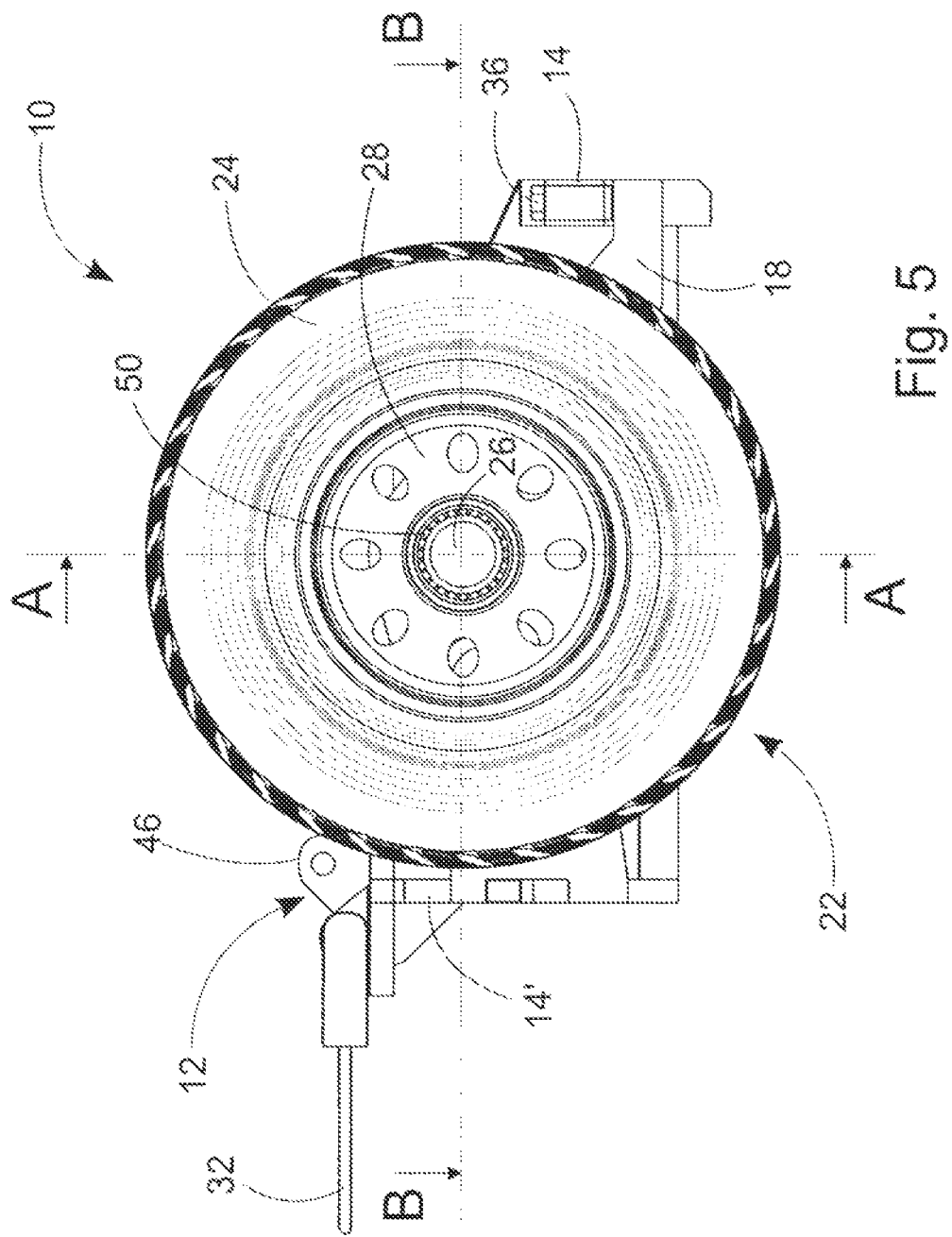
FIG. 5 shows a side view of the transport apparatus according to the invention.

According to FIG. 5, the length of the platform part 21' between the rear part 14' and the front part 14 should be such that the axle of the wheel rotating the crawler track of the loader will take up a position relative to the axles 26 of the transport apparatus 10 that is closer to the rear part 14' of the transport apparatus 10 than to the front part 14. The weight of the loader will then be securely retained in the transport apparatus. In addition, the length of the crawler space is also determined by the diameter of the wheels 22, as there should be space for the inner wheels between the front part 14 and the rear part 14'. The crawler space 21' should be sufficiently wide laterally for the crawler track of the loader to fit inside it in the width direction. The width of the crawler space should be 800-2000 mm. The rear part 14' can include vertical stops 46 for the longitudinal movement of the tracks, against which the loader's tracks are run. In addition, the transport apparatus 10 can include a hoisting loop 32, which is used when handling the transport apparatus 10 with a loader.

FIG. 6 shows a cross-section along the line A-A in FIG. 5. There are preferably at least two wheels 22 on each side of the transport apparatus, so that additional load-bearing capacity is obtained. There can be more wheels, in which case there will be a side part between each wheel, on which the axle is supported. The tyre 24 of each wheel 22 is installed on a rim 28, which rim 28 can, for its part, be permanently attached to the hub 52 of the wheel. FIG. 6 shows how the rims 28 are mounted in bearings with the aid of bearings 50 on the fixed axle 26 by the hubs 52. According to FIGS. 6 and 7 each wheel is mounted separately on bearings on the axle 26, which in turn is permanently attached at the support point 62 of the outer side plate 18. The individual bearing mounting of the wheels permits a variable rotation speed in the wheels, which will improve the steerability of the transport apparatus in curves and reduce the strain on the axle.

FIG. 7 shows a cross-section of the points of FIG. 5 on the line B-B. According to FIGS. 1, 2, and 7, the bottom of the crawler space 21' preferably includes non-slip treads 30. The non-slip treads 30 can be formed of ridges 40 according to the figure. The ridges will lie between the ridges of the tracks and thus prevent the transport apparatus from slipping out from under the track. Alternatively, the non-slip tread can consist of a plate, in which there are recesses, which are gripped by the protrusions of the loader's track.

FIG. 8 shows the transport apparatus 10 seen from underneath. According to FIG. 8, the track space 21' is between the wheels 22. The track space 21' is in the centre relative to the axles 26, so that the weight of the loader being transported will be distributed relatively equally on both axles 26. The loading of the loader onto the transport apparatus 10 takes place by the front part 14 of the chassis 12 of the transport apparatus 10 lying against the ground, when the loader is reversed into the track space 21', until the loader's track comes up against the rear part 14' of the chassis 12. After this, the transport apparatus 10 can be secured to the tracks of the loader with the aid of lugs 46 (shown in FIGS. 1 and 2). At the same time, the non-slip treads 30 prevent the transport apparatus from sliding out from under the loader's tracks.

The transportation of a loader by means of the transport apparatus according to the invention can be implemented according to the schematic images of FIGS. 9a and 9b. In the initial situation, the loader or similar work machine is driven so enough onto one or two transport apparatuses that the crawler track of the loader strikes the rear part of the transport apparatus. The transport apparatus according to the invention is preferably used in such a way that there is one transport apparatus for each of the loader's tracks. When the crawler tracks are rotating, the non-slip treads grip the crawler tracks and the loader is then prevented from moving in the track space of the transport apparatus. In addition to this, the loader can be locked by means of various kinds of locking means.

After this, the work boom 104 of the loader 100' is rotated downwards relative to the horizontal axle onto the platform 108 of the towing device 102, for example a dump truck, until the tracks 106 of the loader 100' rise off the ground into the situation according to FIGS. 9a and 9b. The weight of the loader will then rest of the transport apparatus according to the invention and the platform of the towing device. The distribution of the weight between the platform of the towing device and the transport apparatus will depend on the structure of the loader. After this, the loader will be ready for transportation.

According to one embodiment of the invention, the transport apparatus is suitable for use for transporting large objects weighing more than 100 tn, preferably more than 400 tn. The transport apparatus is particularly intended for transporting loaders with a crawler-track undercarriage, particularly excavators. The work machine to be transported can be any work machine whatever with a crawler-track undercarriage, which is equipped with an excavating device, or some other lifting element. By means of the transport apparatus according to the invention, it is possible to transport a loader weighing more than 400 tn without the overall width of the transport apparatus increasing considerably. Two transport apparatuses according to the invention are preferably used to transport a loader, when there will be one transport apparatus for each track. The transport apparatuses are then preferably transport apparatuses that are separate from each other, which the loader being transported itself connects to each other. Alternatively, the transport apparatuses can be connected to each other with the aid of an intermediate element, to form a single totality.

The axle construction of the transport apparatus according to the invention allows the attachment of the wheels to the axle to be made compact and considerably lighter than the solutions of the prior art. Thus, the distance between the outer wheel and the inner side part can be kept small even in transport apparatuses intended for large loaders, thus permitting a wider crawler space. The construction of the transport apparatus is also simplified by the fact that the rim and hub of the wheels are combined to form a single component, which is easy to manufacture. In addition, the construction can be simplified by making the joints between the components of the chassis bolted joints.

The transport apparatus according to the invention can be equipped with parking brakes 60 (shown in FIG. 2), which lock immediately and automatically once the loader is driven off the transport apparatus. The transport apparatus can also include brakes for use while running, which can restrain the movement of the loader, for example when going downhill. If necessary, the speed of the loader during transportation can be braked by raising the work boom, when the loader's track will make slight contact with the ground.

FIG. 9a shows a rear view of the chassis 12 of the transport carriage according to the invention, shown without wheels and outer side parts. In the figure, the chassis 12 is sectioned, so that the rear plate is not visible. According to FIG. 9a, the inner side parts 16 of the chassis 12 are preferably attached to the platform part 20 between them with the aid of a bolted joint 44. The bolted joint 44 is shown in the area marked with the marking 'det A'. The detail image det A is shown in greater detail in FIG. 10b. The bolted joint 44 is formed from several bolts 80 in parallel, which attach the platform part 20 and the inner side part 16 to each other. Below the platform part 20 there is preferably a second platform part 29, which reinforces the structure. The second platform part 29 is also attached by a bolted joint 44 to the inner side part 16. The second platform part 29 can cover only part of the distance below the platform part 20, or in some cases it may not be required at all.

When transporting an object using the transport apparatus according to the invention, the weight of the object is transmitted through the platform part 20 to the side parts 16, as well as to the front and rear parts 14 and 14', and through them to the second side parts. Though the outer side parts carry most of the load, the bolted joint 44 too between the platform part 20 and the inner side part 16 should be able to carry considerable loads. In order to carry the load, interlocking-joint means 74, which consist of male tongues 72 and female grooves 70, are preferably formed in connection with the bolted joint 44. The bolts 80 of the bolted joint 44 preferably run through the interlocking-joint means 74, more specifically in the centre of the male tongue 72 and the female groove 70. Maximum compression will then be created close to the load-bearing parts, i.e. the interlocking-joint means 74. The bolts can also be above and/or below the interlocking-joint means.

The purpose of the interlocking-joint means is to increase the surface area perpendicular to the bolts, which transmits the vertical forces from the platform part 20 to the side parts 16. With the aid of the interlocking-joint means, the surface area transmitting the vertical force increases many times over, compared to the use of only bolts. Thus, the bolts used can be lighter in structure and thus require smaller counter-boreholes 76 in the platform part. Counter threads for the threads of the bolts are preferably made in the platform part. The task of the bolts in the bolted joint remains mainly to transmit forces parallel to the platform part. Interlocking-joint means can be arranged at least in the platform part and the side parts, but preferably also in the rear part and the front part.

The second platform part 29 can be attached with the aid of bolts 78, without interlocking-joint means. Holes 82, which include enlargements 84 for the heads of the bolts 78 and 80, are preferably made through the side parts 16. This protects the bolt heads from impacts.

The transport apparatus according to the invention can be manufactured from, for example, steel with a high strength, or a similar material, which will withstand the strains imposed on the transport apparatus. The grade of steel used should preferably be so-called double-strength steel, in which case the chassis components to be manufactured can be made half as thick as when they are made from normal steel. In this connection, the term double-strength refers to a grade of steel, with an ultimate strength of more than 500 MPa, preferably 600-1200 MPa.

According to one embodiment, the wheels of the transport apparatus can be supported on the chassis in a so-called floating manner. This means that the two wheels on both sides of the track space are supported with the aid of an individual axle only on the outer side part. The outer side parts are then supported, with the aid of a spherical surface, on the chassis' front and rear part, which spherical surface permits the axle to tilt in the transverse direction of the transport apparatus. This allows both wheels to adapt better to the surface forms of the base and the surface pressure remains equal between the wheels. The solution's appearance can correspond closely to the embodiment shown in FIGS. 1-9b.

Figure 11:
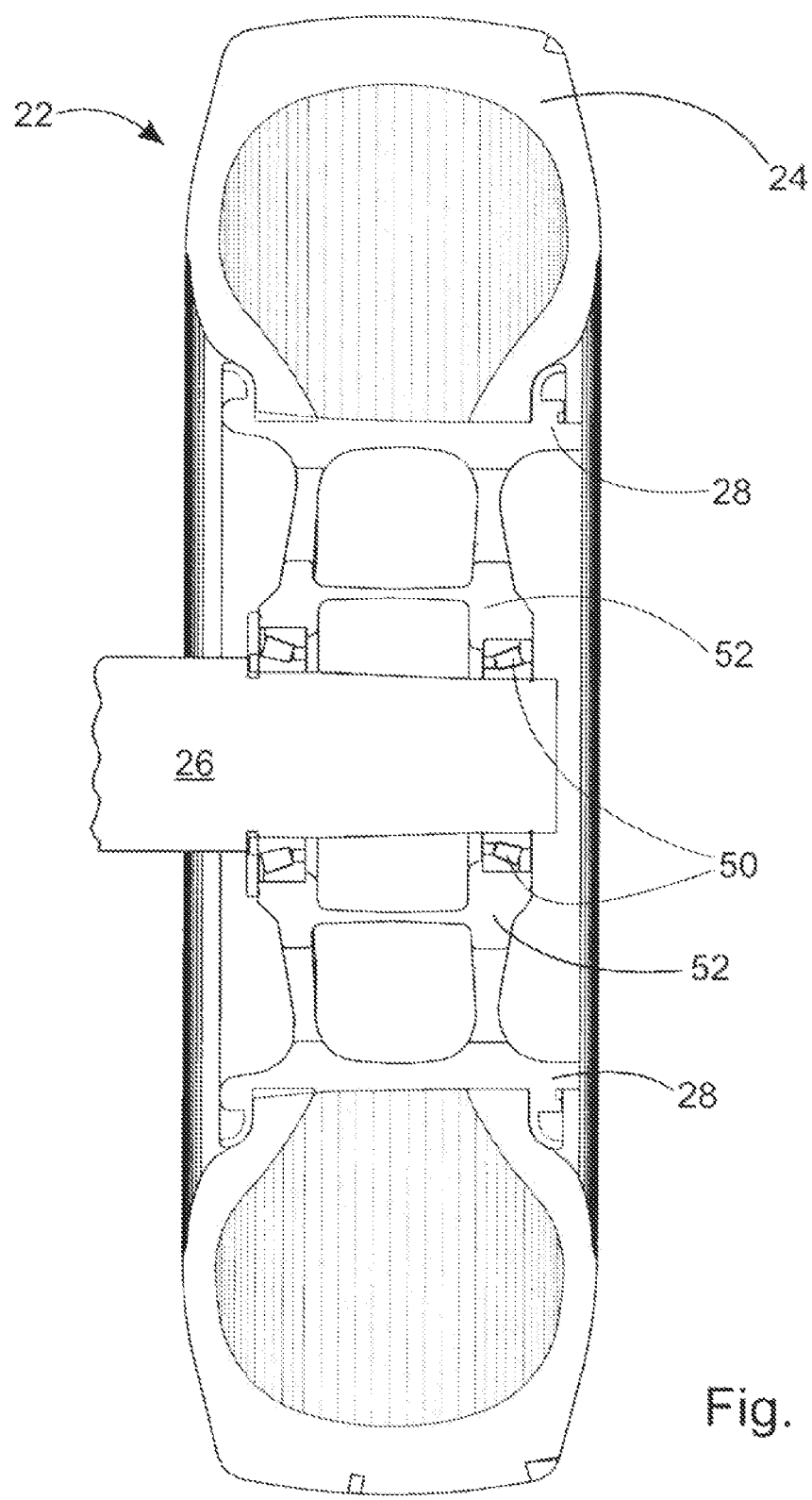

The integrated combination of hub and rim can also be used in transport apparatuses other than those according to the Claims of the present invention, in other words, any transport apparatus whatever intended for transporting heavy objects. More specifically, the combination can be an arrangement like that of FIG. 11 in connection with the wheel of a transport apparatus intended for the transportation of heavy objects, particularly work machines, such as excavators, moving on crawler tracks, equipped with an excavator device or other lifting element, in which arrangement the transport apparatus includes a chassis and wheels 22 attached to the chassis with the aid of a fixed axle, each of which wheel 22 includes a tyre 24, a rim 28 for supporting the tyre 24, as well as a hub 52 for mounting the rim 28 in bearings on an axle 26. The rim 28 and hub 52 are integrated to form a single totality, when the construction will be considerably simpler than in a solution based on a separate hub and rim. In other words, recesses for the bearings are machined directly into the rim, so that a separate hub is not required. Here, the tyre can be pressurized by means of a medium, or a solid rubber, urethane tyre, or some other similar 'solid' tyre.

An interlocking joint between components connected by a bolted joint can also be used in transport apparatuses other than that according to the Claims of the present invention, in other words, in any transport apparatus whatever intended for the transportation of heavy objects. More specifically, the combination can be an arrangement in connection with the chassis of a transport apparatus intended for transporting heavy objects, particularly work machines such as excavators, moving on crawler tracks, equipped with an excavator device or other lifting element, in which arrangement the chassis includes at least two pieces to be attached at essentially right angles to each other, which are arranged to be joined to each other with the aid of bolts, in which at least one of the pieces includes counter threads for the bolts. In the arrangement, there are interlocking-joint means between the pieces, which include a male tongue made in one piece and a female groove made in the other piece. With the aid of the interlocking-joint means, the surface area transmitting force is increased to a much greater extent than by simply adding more bolted joints.

The transport apparatus according to the invention can also be used for transporting heavy objects other than work machines. The objects to be transported can be, for example, parts or partial assemblies of ships, when one or more transport apparatuses can be used next to each other or in line. Such objects can weigh thousands of tonnes. The transport apparatuses can support each other with the aid of the object being transported or a separate intermediate beam.

The invention claimed is:

1. Transport apparatus for transporting heavy objects, namely a work machine moving on crawler tracks and equipped with an excavator device or other lifting element, the transport apparatus comprising:

a chassis, comprising two inner side parts, two outer side parts, a platform part, a rear part between said inner side parts, and a front part, aid outer side parts, said front part, and said rear part together forming a frame enclosed on a horizontal plane, and a load space arranged in the middle of the chassis and formed between the inner side parts, the front part, and the rear part as well as on top of the platform part for a support surface of the object to be transported, wherein a separate axle is disposed on each of two opposite sides of the load space, each axle extending from one of the said two inner side parts through one of said two outer side parts, at least one wheel is mounted on each side of the load space of the chassis with the aid of said axles, said at least one wheel on each side of the load space being located inside of said frame, said load space being disposed between said wheels, and each axle having a spherical surface that supports said axle on the inner side part, and each axle being supported permanently and in a feed-through manner on the outer side part, wherein the transport apparatus is arranged for transporting large objects weighing more than 100 tn.

2. Transport apparatus according to claim 1, wherein at least between the platform part and the inner side parts there are interlocking-joint means for transmitting the weight caused by the object to the inner side parts.

3. Transport apparatus according to claim 1, wherein the transport apparatus comprising at least one additional wheel mounted on each said axle on each side of the load space, in such a way that on each supporting axle span only one wheel is mounted.

4. Transport apparatus according to claim 1, wherein the wheels comprise rims and hubs integrated with each other.

5. Transport apparatus according to claim 1, wherein the said inner side parts, said outer side parts, said front part, said rear part, and said platform part are attached to each other with bolted joints.

6. Transport apparatus according to claim 5, wherein the said bolted joints are arranged at locations of interlocking-joint means.

7. Transport apparatus according to claim 1, wherein each wheel is independently mounted on bearings on one of said axles.

8. Transport apparatus according to claim 1, wherein the load space is a crawler space for a crawler track acting as a support surface of the work machine to be transported.

9. Transport apparatus according to claim 1, wherein the transport apparatus is manufactured from steel, the ultimate strength of which is more than 500 MPa.

* * * * *